July 23, 1963 S. H. M. DODINGTON 3,098,980

PULSE SHAPING KLYSTRON MODULATOR

Filed Oct. 6, 1958 2 Sheets-Sheet 1

INVENTOR.
SVEN H. M. DODINGTON
BY Philip M. Bolton
ATTORNEY

July 23, 1963 S. H. M. DODINGTON 3,098,980

PULSE SHAPING KLYSTRON MODULATOR

Filed Oct. 6, 1958

2 Sheets-Sheet 2

INVENTOR.
SVEN H. M. DODINGTON
BY Philip M. Bolton
ATTORNEY 3,098,980
PULSE SHAPING KLYSTRON MODULATOR Sven H. M. Dodington, Mountain Lakes, N.J., assignor to International Telephone and Telegraph Corporation, Nutley, N.J., a corporation of Maryland Filed Oct. 6, 1958, Ser. No. 765,355
14 Claims. (Cl. 332—7)

This invention relates to wave shaping circuits and more particularly to modulation systems for Klystrons which provide a minimum frequency spectrum output.

In navigation systems and other pulse systems, such as Tacan and Loran, it is highly desirable to obtain the shortest possible pulse rise time and at the same time generate the least interference to the adjacent RF channel. The two conflicting requirements of short pulse duration and narrow spectrum are generally met by the use of a pulse of gaussian shape. The gaussian pulse is used with the object of reducing the number and magnitude of the transmitted side bands. Efforts have been directed recently to schemes for generating gaussian wave shapes for use in systems where the requirements for the shortest possible rise time and least possible interference to the adjacent RF channel are in order.

Prior art teaching indicates that one way to generate such a pulse is to modulate a radio frequency amplifier with a rectangular pulse and then to follow this amplifier with a sharply tuned RF filter which eliminates the unwanted side band components. This system suffers from the fact that the radio frequency filter has some insertion loss at the center frequency. Thus, even when operating at a fixed frequency, there is a considerable loss of power. Under conditions where the frequency must be rapidly changed, the system becomes impossibly complex due to the precise tuning that is necessary.

The solution to the problem appears to be obvious. In order to obtain a radio frequency pulse of the correct shape, all that is necessary is to modulate the RF amplifier with a video pulse of the correct shape. This technique, however, has never been easy because the non-linearity of the radio frequency amplifier has never been exactly matched by a corresponding distortion of the video pulse shape.

A way around this problem has been proposed in some prior art systems. In one system, advantage is taken of the fact that most RF amplifiers already possess a somewhat gaussian shape of their modulation voltage versus radio frequency output voltage. By applying a triangular modulating wave to such a radio frequency amplifier, it is possible to obtain the desired radio frequency pulse shape, that is, a gaussian output pulse. In this type of system, the triangular wave is generated by charging and discharging a capacitance at constant current. This system, however, is highly dependent on the timing of the triangular wave exactly matching the bias and radio frequency characteristics of the radio frequency amplifier. In practice, especially with multi-channel equipments, this is a difficult requirement to meet and radio frequency waveforms which are undesirable may result. The resulting undesired waveforms may be either too narrow, with low amplitude and wide spectrum or too wide, with consequent waste of power.

It is therefore an object of this invention to provide a waveform generating circuit which is an improvement on prior art circuitry.

It is another object of this invention to provide a waveform generating circuit which controls the instant at which a first modulating voltage is removed from and a second modulation voltage is applied to an electron discharge device.

A further object of this invention is to provide a Klystron modulating system which permits the generation of a substantially gaussian wave shape at the Klystron output.

A feature of this invention is the utilization of an electron discharge device adapted to produce a modulated output along with means for applying first and second modulating voltages to the electron discharge device. In addition, means coupled to the output of the electron discharge device are utilized to control the instant at which the first modulating voltage is removed from the electron discharge device and at which the second modulating voltage is applied to the electron discharge device.

Another feature of this invention is the utilization of a number of circuits responsive to the rate of change of amplitude of a radio frequency envelope in conjunction with a delay line to provide a radio frequency amplifier with an output which is substantially gaussian in shape.

The above-mentioned and other features and objects of this invention will become more apparent by reference to the following description taken in conjunction with the accompanying drawings, in which.

Figures 1, 3:
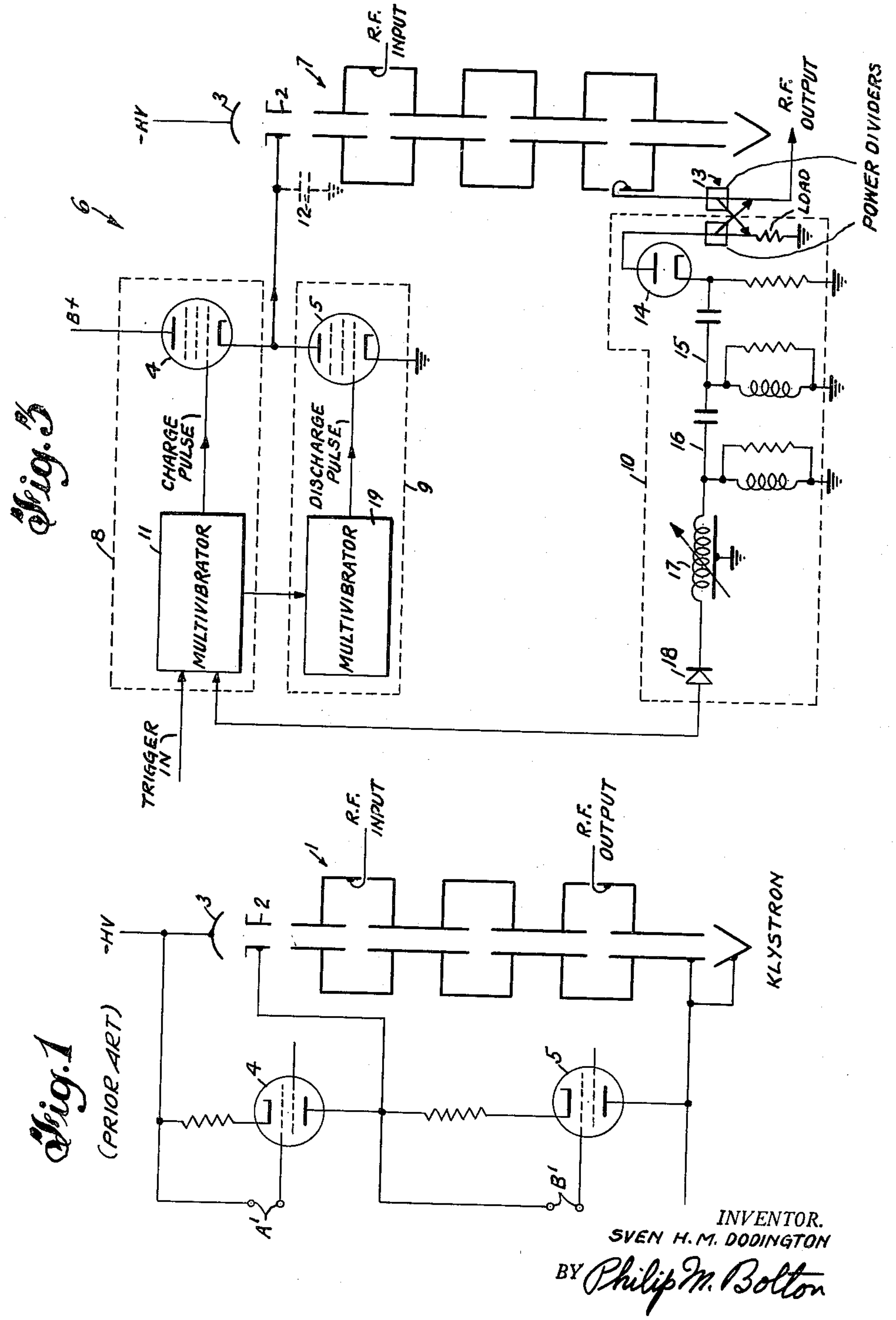
FIG. 1 is a schematic representation of prior art circuitry which provides a gaussian shaped radio frequency output pulse.
FIG. 3 is a schematic representation of a wave shaping circuit which operates in accordance with the principles of this invention.
Figure 2:
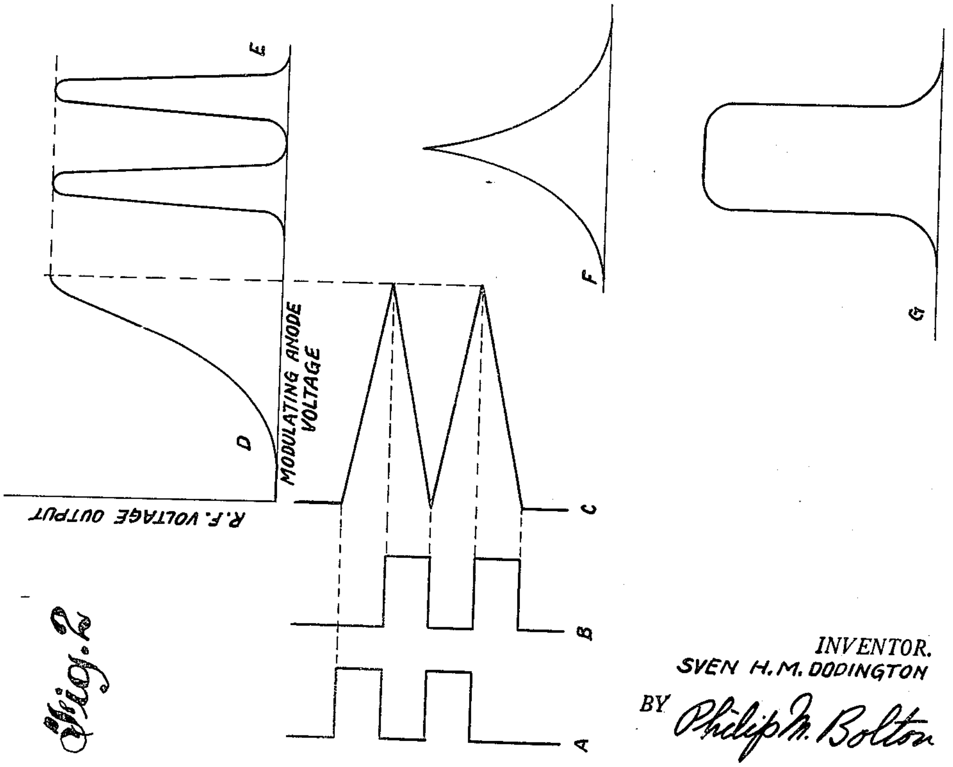
FIG. 2 is a representation of a series of curves useful in describing the operation of the circuit of FIG. 1.

Referring to FIG. 1, there is shown therein a prior art system having a multi-cavity Klystron 1, and a modulating anode 2 disposed adjacent the Klystron cathode 3. Coupled to modulating anode 2 are two vacuum tubes 4 and 5 which have the required constant current characteristics to charge and discharge the capacitance of Klystron 1 and the associated circuitry with a linearly rising and falling voltage waveform. To obtain a gaussian shaped output pulse from Klystron 1 using the circuitry of FIG. 1, a square pulse designated A in FIG. 2 is applied to terminals A′ of vacuum tube 4 from a pulse transformer or some other conventional pulse source. Due to the special characteristics of vacuum tube 4, such as may be found in the Eimac Y–111 vacuum modulator tube, the pulse applied from the pulse source causes a voltage which rises linearly with time to charge up the capacitance of Klystron 1 and its associated circuitry and to appear on the anode 2 of Klystron 1. The duration of this pulse is made equal to the desired rise time. At the end of this time, another square pulse designated B in FIG. 2 is applied to terminals B′ of vacuum tube 5 which causes the Klystron and circuit capacitance to discharge at a constant rate through vacuum tube 5 thereby causing the modulating anode voltage to fall linearly with respect to time. The triangular waveform designated C in FIG. 2 is, therefore, applied to modulating anode 2 and because of the shape of the modulation anode transfer characteristic shown at D in FIG. 2, an output wave having a gaussian waveshape and designated E in FIG. 2 results at the output of Klystron 1. While this scheme is relatively simple, the system is highly dependent on the timing of the triangular wave exactly matching the bias and the radio frequency characteristics of the RF amplifier. As has already been mentioned, in practice, this is a difficult requirement to meet particularly in multi-channel equipments. Thus, radio frequency waveforms which are undesirable may result and may be either too narrow, with low amplitude and wide spectrum as shown in the wave shape designated F in FIG. 2 or too wide, with a consequent waste of power as shown in the wave shape designated G in FIG. 2.

Referring to FIG. 3, there is shown therein a modulator system 6 comprising an electron discharge device 7 which is adapted to produce a modulated output. Further, means 8 for applying a first modulating voltage to said electron discharge device are shown and means for applying a second modulating voltage 9 to said device are shown. In addition, means 10 coupled to the output of the electron discharge device to control the instant at which the first voltage is removed and a second voltage is applied to said device are shown.

In FIG. 3 the electron discharge device 7 may be a multi-cavity Klystron such as referred to in FIG. 1 and designated 1 in that figure. As in FIG. 1 the electron discharge device 7 of FIG. 3 contains a modulating anode 2 disposed adjacent cathode 3. The means 8 for applying a first modulating voltage to electron discharge device 7 includes a vacuum tube 4 such as shown in FIG. 1 and further includes a single input monostable multivibrator 11. Multivibrator 11 operates in the manner well known to those skilled in the electronics art, and is used to provide a charging pulse to the control grid of vacuum tube 4. Vacuum tube 4 is a special tetrode having a constant current characteristic which charges the capacitance of the electron discharge device 7 and associated circuitry with a linearly rising voltage waveform. Thus, vacuum tube 4 upon being energized by the output of multivibrator 11 provides a constant current which charges up the capacity of the electron discharge device and its associated circuitry, and appears as a linearly rising voltage across the circuit capacitance. This capacitance is illustrated as dotted capacitance 12 in FIG. 3. The voltage due to the charging of capacitance 12 appearing on capacitance 12 also appears on anode 2 of electron discharge device 7. Since the transfer characteristic of electron discharge device 7 is substantially gaussian in form, the modulated radio frequency output of the electron discharge device 7 appears as a gaussian shaped envelope. The major portion of the gaussian shaped output is delivered to some utilization device but a portion is delivered by means of directional coupler 13 to control means 10 which includes a demodulator 14, two differentiating networks, respectively, 15 and 16, a variable delay line 17 and a clipping diode 18. The output of control means 10 after being appropriately shaped and delayed by the aforementioned circuits is fed back to monostable multivibrator 11 to remove the charge pulse and simultaneously deliver a pulse to a second multivibrator 19 which in turn initiates a discharge pulse which energizes vacuum tube 5 thereby causing capacitance 12 to discharge through vacuum tube 5 at a linearly decreasing rate. Vacuum tube 5 is identical with vacuum tube 4. In this manner, therefore, the instant at which the first modulating voltage is removed and the instant at which the second modulating voltage is applied to the electron discharge device is carefully controlled and the pulse output of electron discharge device 7 is substantially gaussian in shape and the possibility of obtaining the undesired wave shapes designated F and G in FIG. 2 is eliminated.

Figure 4:
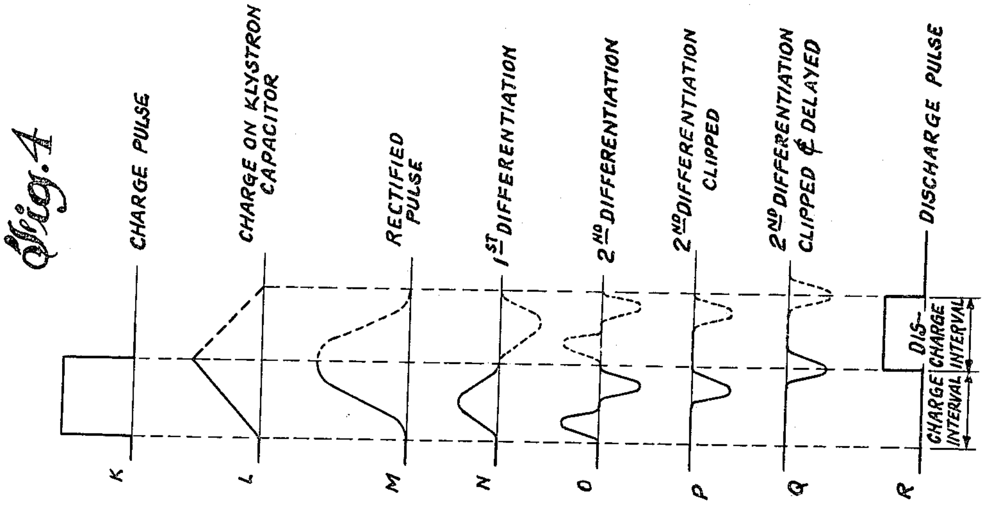
FIG. 4 is a representation of a series of curves useful in describing the operation of the circuit of FIG. 3.

An observation of the curves of FIG. 4 taken in conjunction with FIG. 3 will indicate more concisely the manner of operation of the circuitry of FIG. 3. The solid line portions of the curves of FIG. 4 indicate the charging cycle, while the dotted portions are indicative of the discharge cycle.

In FIG. 3 a trigger pulse is delivered to multivibrator 11 and an output pulse in the form of a positive square wave, shown at K in FIG. 4, is applied to the control grid of tetrode 4. Due to the characteristics of this special tetrode, a constant current flows for the duration of charge pulse K and the capacitance 12 of the electron discharge device 7 and its associated circuitry is charged up in a linear fashion. The linearly rising voltage resulting from charging capacitance 12 at a constant current is shown at L in FIG. 4 and it is this voltage which is applied to the modulating anode 2 of electron discharge device 7. Because of the particular transfer characteristic of electron discharge device 7, that is, a substantially gaussian transfer characteristic, the radio frequency output of electron discharge device 7 has a modulated output which appears as a gaussian waveform. The radio frequency output after passing through directional coupler 13 and through detector element 14 appears as the rectified radio frequency pulse such as shown at M in FIG. 4. The rectified radio frquency pulse is introduced into first differentiating network 15 where the derivative of the rectified RF pulse is obtained. The derivative of the gaussian waveform appears as shown at N in FIG. 4. A subsequent differentiation in differentiating network 16 provides an output which appears as shown at O in FIG. 4. By clipping the positive peaks with an appropriately arranged diode, the twice differentiated waveform of FIG. 4—O appears as shown at P in FIG. 4 as a single negative pulse. A delay shown at Q in FIG. 4 which may be introduced either prior to or subsequent to the clipping places the shaped waveform of O at a point such that it will remove the charging pulse on vacuum tube 4 and at the same time cause a signal to be delivered from multivibrator 11 to multivibrator 19 to initiate the discharge pulse shown at R in FIG. 4 to vacuum tube 5. The dotted portion of the curves of FIG. 4 are due to the application of the discharge pulse shown at R in FIG. 4 and the linearly falling portion of L of FIG. 4 is the discharging voltage which is applied to modulating anode 3. The envelope of one output pulse from electron discharge device 7 would, therefore, include the solid and dotted portions of the curve shown at M in FIG. 4. In this manner, therefore, by supplying circuits which are responsive to the minimum rate of change of amplitude of the RF envelope, it is possible to control the instant at which the charge and discharge pulses are applied to the modulating anode of electron discharge device 7 and thereby obtain an optimum gaussian shaped output.

While I have described above the principles of my invention in connection with specific apparatus, it is to be clearly understood that this description is made only by way of example and not as a limitation to the scope of my invention as set forth in the objects thereof and in the accompanying claims.

I claim:

1. A modulator system comprising:
an electron discharge device adapted to produce a modulated output;
first means to periodically generate and apply a first modulating voltage to said device;
second means to periodically generate and apply a second modulating voltage to said device;
means interconnecting said first and second means;
means coupled to said first means to control the instant said first voltage is generated and applied to said device; and
means coupled to the output of said device and one of said first and second means to control the instant said first voltage is removed from and said second voltage is generated and applied to said device.

2. A klystron modulator system comprising:
a klystron;
first means to periodically generate and apply a first modulating voltage to said klystron;
second means to periodically generate and apply a second modulating voltage to said klystron;
means interconnecting said first and second means;
means coupled to said first means to control the instant said first voltage is generated and applied to said klystron; and
means coupled to the output of said klystron and one of said first and second means to control the instant said first voltage is removed from and said second voltage is generated and applied to said klystron.

3. A klystron modulator system comprising:
a klystron;
first means to periodically generate and apply a first modulating voltage to said klystron which varies linearly with time;

a second means to periodically generate and apply a second modulating voltage to said klystron which also varies linearly with time;

means interconnecting said first and second means;

means coupled to said first means to control the instant said first voltage is generated and applied to said klystron; and means coupled to the output of said klystron and one of said first and second means to control the instant said first voltage is removed from and said second voltage is generated and applied to said klystron.

4. A klystron modulator system comprising:

a klystron having a modulating anode disposed therein;

first means to periodically generate and apply a first modulating voltage to said anode which varies linearly with time;

second means to periodically generate and apply a second modulating voltage to said anode which also varies linearly with time;

means interconnecting said first and second means;

means coupled to said first means to control the instant said first voltage is generated and applied to said anode; and means coupled to the output of said klystron and one of said first and second means to control the instant said first voltage is removed from and said second voltage is generated and applied to said anode.

5. A klystron modulator system comprising:

a klystron having a modulating anode disposed therein;

first means to periodically generate and apply a first modulating voltage to said anode which varies linearly with time;

second means to periodically generate and apply a second modulating voltage to said anode which also varies linearly with time;

means interconnecting said first and second means;

means coupled to said first means to control the instant said first voltage is generated and applied to said anode; and means coupled to the output of said klystron and one of said first and second means responsive to the lowest rate of change of amplitude of the radio frequency modulation envelope to control the instant said first voltage is removed from and said second voltage is generated and applied to said anode.

6. A system according to claim 5, wherein said first means includes:

means for charging up the capacitance of said klystron and its associated circuitry at a given linear rate.

7. A system according to claim 5, wherein said second means includes:

means for discharging the capacitance of said klystron and its associated circuitry at a given linear rate.

8. A system according to claim 5, wherein said control means includes:

means for detecting the radio frequency output due to the application of said first voltage to said anode;

first circuit means to differentiate the output of said detecting means;

second circuit means to differentiate the output of said first circuit means;

adjustable delay means coupled to said second circuit means; and means responsive to the output of said delay means for removing said first voltage from and applying said second voltage to said anode.

9. A klystron modulator system comprising:

a klystron having a modulating anode disposed therein;

first means to periodically generate and apply a first modulating voltage to said anode which varies linearly with time;

second means to periodically generate and apply a second modulating voltage to said anode which also varies linearly with time;

means interconnecting said first and second means;

means coupled to said first means to control the instant said first voltage is generated and applied to said anode; and means coupled to the output of said klystron and one of said first and second means responsive to the zero rate of change of amplitude of the radio frequency modulation envelope to control the instant said first voltage is removed from and said second voltage is generated and applied to said anode.

10. A modulator system comprising:

an electron discharge device adapted to produce a modulated output, said electron discharge device having a substantially gaussian transfer characteristic;

first means to periodically generate and apply a first modulating voltage to said device;

second means to periodically generate and apply a second modulating voltage to said device;

means interconnecting said first and second means;

means coupled to said first means to control the instant said first voltage is generated and applied to said device; and means coupled to the output of said device and one of said first and second means to control the instant said first voltage is removed from and said second voltage is generated and applied to said device.

11. A wave shaping circuit comprising:

a radio frequency electron discharge device having a given wave shape output;

controllable means including:

first means coupled to said device to periodically generate a first modulating voltage;

second means coupled to said device to periodically generate a second modulating voltage; and means interconnecting said first and second means;

means coupled to said first means to control the instant said first voltage is generated for application to said device;

means coupled to the output of said device responsive to a given portion of said given wave shape output to produce a control signal indicative of the time of occurrence of said given portion; and means to couple said control signal to said controllable means to control the instant at which said first voltage is removed from and said second voltage is generated and applied to said device to vary the power and sideband frequency content of the output of said device.

12. A wave shaping circuit comprising:

a radio frequency electron discharge device having a substantially gaussian wave shape output;

controllable means including:

first means coupled to said device to periodically generate a first modulating voltage;

second means coupled to said device to periodically generate a second modulating voltage;

means interconnecting said first and second means;

means coupled to said controllable means to control the instant said first voltage is generated and applied to said device;

means coupled to the output of said device responsive to the minimum slope of said gaussian wave shape output to produce a control signal indicative of the time of occurrence of said minimum slope; and means to couple said control signal to said controllable means to control the instant said first voltage is removed from and said second voltage is generated and applied to said device to vary the power and sideband frequency content of the output of said device.

13. A klystron modulator system comprising:

a klystron having a modulating anode disposed therein;

first means for generating and applying at a predetermined instant of time a first modulating voltage which varies linearly with time to said anode;

second means for generating and applying a second modulating voltage which also varies linearly with time to said anode;

means interconnecting said first and second means; and means coupled to the output of said klystron responsive to the lowest rate of change of amplitude of the radio frequency modulation envelope to control the instant said first voltage is removed from and said second voltage is applied to said anode, said responsive means including:

means for detecting the radio frequency output due to the application of said first voltage to said anode;

first circuit means to differentiate the output of said detecting means;

second circuit means to differentiate the output of said first circuit means;

adjustable delay means coupled to said second circuit means; and means responsive to the output of said delay means for removing said first voltage from and said second voltage is generated and applied to said anode.

14. A modulator system comprising:

an electron discharge device adapted to produce a modulated output;

first means to periodically generate and apply at a predetermined instant of time a first modulating voltage to said device;

means for generating and applying a second modulating voltage to said device;

means interconnecting said first and second means; and means coupled to the output of said device and one of said first and second means to control the instant said first voltage is removed from and said second voltage is generated and applied to said device.

References Cited in the file of this patent

UNITED STATES PATENTS

| | | |
|---|---|---|
| 2,562,188 | Hance | July 31, 1951 |
| 2,569,164 | Greenwood et al. | Sept. 25, 1951 |
| 2,596,167 | Philpott | May 13, 1952 |
| 2,648,005 | Taylor et al. | Aug. 4, 1953 |
| 2,694,149 | Gross | Nov. 9, 1954 |
| 2,823,311 | Bastir | Feb. 11, 1958 |